United States Patent [19]

High

[11] Patent Number: 5,791,699
[45] Date of Patent: Aug. 11, 1998

[54] KNOT TYER

[76] Inventor: Kenneth High, P.O. Box 1415, Dillon, Mont. 59725

[21] Appl. No.: 749,245

[22] Filed: Nov. 4, 1996

[51] Int. Cl.$^6$ .................................................. D03J 3/00
[52] U.S. Cl. ................................................................ 289/17
[58] Field of Search .................................. 289/2, 17, 18.1

[56] References Cited

U.S. PATENT DOCUMENTS

| | | | |
|---|---|---|---|
| 2,934,369 | 4/1960 | Kennedy | 289/17 |
| 3,101,964 | 8/1963 | Reaser | 289/17 |
| 3,180,665 | 4/1965 | Bartlett | 289/17 |
| 3,265,422 | 8/1966 | Pierce | 289/17 |
| 3,396,998 | 8/1968 | Scoville | 289/17 |
| 3,575,449 | 4/1971 | Browning | 289/17 |
| 3,625,556 | 12/1971 | Stromberg | 289/17 |
| 3,694,014 | 9/1972 | Rossbach et al. | 289/17 |
| 3,706,466 | 12/1972 | Landry et al. | 289/17 |
| 4,525,003 | 6/1985 | Tate, Jr. | 289/17 |

Primary Examiner—Michael A. Neas

[57] ABSTRACT

The knot tyer in accordance with the present invention includes, a hollow, elongated body member with a coil expansion spring mounted tubular piston therein and a release thereon. The hollow, elongated body member has a tubular piston slidably mounted and constrained within a cylindrical, hollow bore therethrough. The tubular piston has a first shoulder, a second shoulder, and a groove extending around the diameter of the tubular piston. The cylindrical, hollow bore in the rear end of the hollow, elongated body member accommodates in free longitudinally sliding manner a first shoulder on the tubular piston as well as a coil expansion spring encircling the tubular piston. The cylindrical, hollow bore in the front end of the hollow, elongated body member accommodates in free longitudinally sliding manner a second shoulder and a groove on the tubular piston. The release is pivotally attached to the hollow, elongated body member by a pin, which pin allows the release to pivot on the external longitudinal axis of the hollow, elongated body member. The tubular piston has a grooved and notched front end. The front end of the tubular piston is grooved so as to be open on the top and hollow internally. The front end of the tubular piston has a diagonal notch in the shape of a jaw cut therethrough.

1 Claim, 1 Drawing Sheet

KNOT TYER

BACKGROUND OF THE INVENTION

1. Field of the Invention

This invention pertains generally to improvements relating to fishermen tools, and more particularly concerns fishermen tools which are particularly adapted to have a purpose of being a knot tying tool, but which may also be used as a fish hook removal tool.

2. Description of the Prior Art

Technological advancements are resulting in fishermen using multipurpose devices to a greater extent, said multipurpose devices being relatively easily manufactured, inexpensive and requiring less space for storage.

Prior art discloses a variety of fishermen devices used for particular purposes, but generally such fishermen devices are limited by the particular purpose for which they are used.

Knot tying devices of the general type to which the present invention pertains have been heretofore known in the art. Likewise, fish hook removal methods similar to that for which the present invention may be utilized are known in the art.

U.S. Pat. No. 2,722,080 to Lemberger teaches a fish hook dislodger of the cocked spring type. The Lemberger fish hook remover provides a jaw which engages an embedded hook and a tapered head which is secured against the hook. The Lemberger fish hook remover further provides that a spring is cocked and when released, the fish hook remover handle is drawn toward the hook at a high rate of speed and when a link strikes a head in the handle, a relatively heavy blow thereby dislodges the hook.

U.S. Pat. No. 2,926,036 to Wimberley teaches a fisherman's knot tying tool for tying leaders or lines to fishing hooks or flies.

U.S. Pat. No. 3,086,802 to Keeton teaches a knot tying device having the capability of tying or tightening the various knots that may be required in the art of fishing. The Keeton knot tying device provides a body and a retractable mandrel made of a bundle of different stiff, resilient wires.

U.S. Pat. No. 3,265,422 to Pierce teaches a threading and knot tying device for fish hooks.

U.S. Pat. No. 3,694,014 to Rossbach et al. teaches a fishing tool embodying a knot tier with an elongated member extending therefrom in position relative to a portion of the knot tier effective to clampingly engage a carrying member.

However, the knot tiers and the fish hook remover as have been heretofore known in the art commonly have had several inherent disadvantages, such as, for example, being limited to a single use. Another disadvantage of knot tiers known in the art is that known knot tiers require a step of transferring the knot from a post or arbor onto another line, often resulting in the knot falling apart or disassembling during such transfer.

For this reason, it would be highly beneficial to provide a fishing tool, which in addition to including the well-known and beneficial features, includes other features which are specially adapted to assist in the performing of many other common fishing activities and will prolong the effectiveness of the fishing tool by minimizing the misuse of the existing features. It would be highly beneficial to provide a fishing tool which provides for a knot tying device, but which may also be used as a fish hook removal device, with said fishing tool being relatively easily manufactured, inexpensive and requiring less space in fishing tackle storage containers. It would be highly beneficial to provide a fishing tool which provides a knot tying device that eliminates the step of transferring the knot from a post or arbor onto another line.

SUMMARY OF THE INVENTION

The knot tyer in accordance with the present invention includes, in general, a hollow, elongated body member with a coil expansion spring mounted tubular piston therein and a release thereon.

The hollow, elongated body member has a cylindrical, hollow bore therethrough on a longitudinal axis. The hollow, elongated body member is provided with a circular, externally threaded opening on a rear end thereof. The circular, externally threaded opening accommodates a circular, internally threaded collar. The hollow, elongated body member is provided with a tapered opening on a front end thereof. The hollow, elongated body member is provided with a release mounted on the front end thereof.

The hollow, elongated body member has a tubular piston slidably mounted and constrained within the cylindrical, hollow bore therethrough. The tubular piston has a first shoulder, a second shoulder, and a groove extending around the diameter of the tubular piston.

The hollow, elongated body member has a cylindrical, hollow bore therethrough on the longitudinal axis, said cylindrical, hollow bore being of sufficient diameter to accommodate the tubular piston in free longitudinally sliding manner. The cylindrical, hollow bore has a diameter in the front end of the hollow, elongated body member and a diameter in the rear end of the hollow, elongated body member, which diameter in the front end of the hollow, elongated body member is a smaller diameter than the diameter in the rear end of the hollow, elongated body member.

The cylindrical, hollow bore in the rear end of the hollow, elongated body member accommodates in free longitudinally sliding manner a first shoulder on the tubular piston as well as a coil expansion spring encircling the tubular piston, said coil expansion spring being held in said encircling position within the cylindrical, hollow bore by said first shoulder on the tubular piston and a shoulder created internally of the hollow, elongated body member by the reduction in diameter of the cylindrical, hollow bore. The first shoulder on the tubular piston and the coil expansion spring mounted on the tubular piston are constrained within the cylindrical, hollow bore by the circular, internally threaded collar.

The cylindrical, hollow bore in the front end of the hollow, elongated body member accommodates in free longitudinally sliding manner a second shoulder and a groove on the tubular piston.

Mounted externally on the front end of the hollow, elongated body member is a release. The release is pivotally attached to the hollow, elongated body member by a pin, which pin allows the release to pivot on the external longitudinal axis of the hollow, elongated body member. The release is held in a closed position by a spring, which spring is located on the rear portion of the release and which spring allows the release to return to the closed position after being pivoted to open position. The release has a prong on a front end thereof, which prong, when the release is in the closed position, is forced in a direction towards and seats within the groove of the tubular piston.

When the tubular piston is longitudinally slid in a forward direction within the hollow, elongated body member, the first shoulder on the tubular piston compresses the coil expansion spring against the shoulder created internally of the hollow, elongated body member by the reduction in diameter of the cylindrical, hollow bore. The second shoulder and groove on the tubular piston are likewise longitudinally slid in a forward direction within the hollow, elongated body member the prong of the release seats in the groove on the tubular piston. The prong is held in the groove on the tubular piston by the spring on the release forcing the front of the prong toward and into the groove of the tubular piston and the coil expansion spring forcing the second shoulder on the tubular piston against the prong in a rearward direction.

Activating the release by pressing on the rear portion of the release removes the prong from the groove on the tubular piston resulting in the tubular piston rapidly and forcefully being longitudinally slid in a rearward direction of the longitudinal axis of the hollow, elongated body member by the coil expansion spring decompressing and forcing the first shoulder on the tubular piston in a rearward direction within the cylindrical, hollow bore, said longitudinal rearward sliding by the tubular piston stopping when the first shoulder on the tubular piston strikes the circular, internally threaded collar.

The tubular piston has a grooved and notched front end. The front end of the tubular piston is grooved so as to be open on the top and hollow internally. The front end of the tubular piston has a diagonal notch in the shape of a jaw cut therethrough.

It is an object of the present invention to provide a knot tying device which may also be used as a fish hook removal device, with said knot tyer being relatively easily manufactured, inexpensive and requiring less space in fishing tackle storage containers.

It is a further object of the present invention to provide a knot tying device that eliminates the step of transferring the knot from a post or arbor onto another line.

IN THE DRAWINGS

DESCRIPTION OF THE PREFERRED EMBODIMENT

Figure 1:
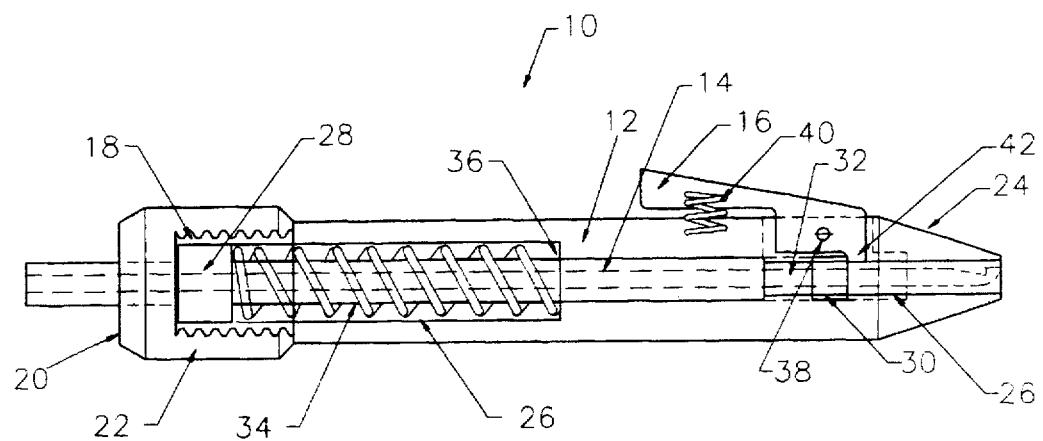
FIG. 1 is a plan view of the knot tyer of the present invention with the tubular piston retracted.

Referring now more particularly to the drawings, reference numerals will be used to denote like parts or structural features in the different views. While a particular embodiment of the invention has been shown and described, it will be understood that the invention is not limited thereto, since modifications may be made that will become apparent to those skilled in the art.

Figure 2:
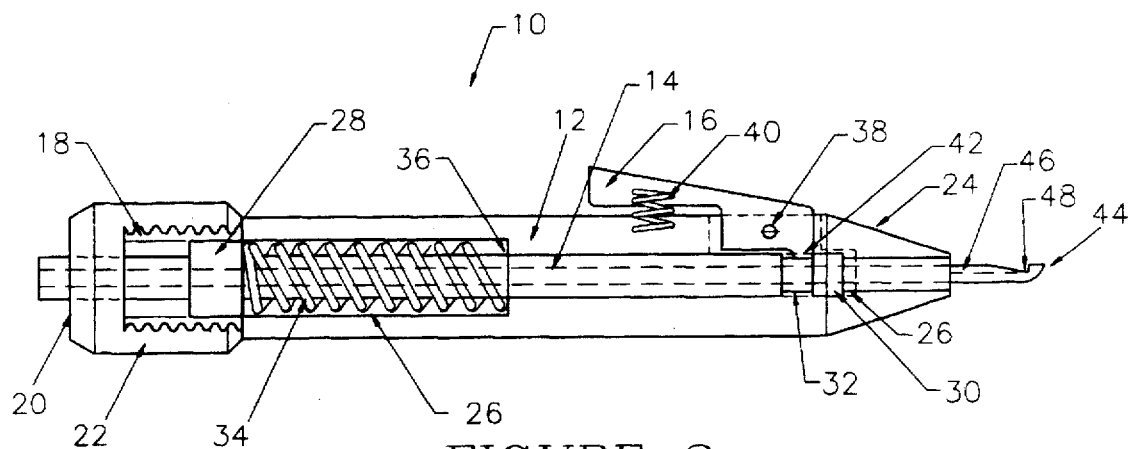
FIG. 2 is a plan view of the knot tyer of the present invention with the tubular piston extended.

A knot tyer 10, embodying the principles of the present invention, is shown in FIGS. 1 and 2 of the drawings to illustrate the presently preferred embodiment of the present invention. The knot tyer 10 of the present invention embodies, in general, a hollow, elongated body member 12 with a coil expansion spring 34 mounted tubular piston 14 thereon and a release 16 thereon.

The hollow, elongated body member 12 has a cylindrical, hollow bore 26 therethrough on a longitudinal axis. The hollow, elongated body member 12 is provided with a circular, externally threaded opening 18 on a rear end 20 thereof. The circular, externally threaded opening 18 accommodates a circular, internally threaded collar 22. The hollow, elongated body member 12 is provided with a tapered opening on a front end 24 thereof. The hollow, elongated body member 12 is provided with a release 16 mounted on the front end 24 thereof.

The hollow, elongated body member 12 has a tubular piston 14 slidably mounted and constrained within the cylindrical, hollow bore 26 therethrough. The tubular piston 14 has a first shoulder 28, a second shoulder 30, and a groove 32 extending around the diameter of the tubular piston 14.

The hollow, elongated body member 12 has a cylindrical, hollow bore 26 therethrough on the longitudinal axis, said cylindrical, hollow bore 26 being of sufficient diameter to accommodate the tubular piston 14 in free longitudinally sliding manner. The cylindrical, hollow bore 26 has a diameter in the front end 24 of the hollow, elongated body member 12 and a diameter in the rear end 20 of the hollow, elongated body member 12, which diameter in the front end 24 of the hollow, elongated body member 12 is a smaller diameter than the diameter in the rear end 20 of the hollow, elongated body member 12.

The cylindrical, hollow bore 26 in the rear end 20 of the hollow, elongated body member 12 accommodates in free longitudinally sliding manner a first shoulder 28 on the tubular piston 14 as well as a coil expansion spring 34 encircling the tubular piston 14, said coil expansion spring 34 being held in said encircling position within the cylindrical, hollow bore 26 by said first shoulder 28 on the tubular piston 14 and a shoulder 36 created internally of the hollow, elongated body member 12 by the reduction in diameter of the cylindrical, hollow bore 26. The first shoulder 28 on the tubular piston 14 and the coil expansion spring 34 mounted on the tubular piston 14 are constrained within the cylindrical, hollow bore 26 by the circular, internally threaded collar 22.

The cylindrical, hollow bore 26 in the front end 24 of the hollow, elongated body member 12 accommodates in free longitudinally sliding manner a second shoulder 30 and a groove 32 on the tubular piston 14.

Mounted externally on the front end 24 of the hollow, elongated body member 12 is a release 16. The release 16 is pivotally attached to the hollow, elongated body member 12 by a pin 38, which pin 38 allows the release 16 to pivot on the external longitudinal axis of the hollow, elongated body member 12. The release 16 is held in a closed position by a spring 40, which spring 40 is located on the rear portion of the release 16 and which spring 40 allows the release 16 to return to the closed position after being pivoted to open position. The release 16 has a prong 42 on a front end thereof, which prong 42, when the release 16 is in the closed position, is forced in a direction towards and seats within the groove 32 of the tubular piston 14.

When the tubular piston 14 is longitudinally slid in a forward direction within the hollow, elongated body member 12, the first shoulder 28 on the tubular piston 14 compresses the coil expansion spring 34 against the shoulder 36 created internally of the hollow, elongated body member 12 by the reduction in diameter of the cylindrical, hollow bore 26. The second shoulder 30 and groove 32 on the tubular piston 14 are likewise longitudinally slid in a forward direction within the hollow, elongated body member 12 the prong 42 of the release 16 seats in the groove 32 on the tubular piston 14. The prong 42 is held in the groove 32 on the tubular piston 14 by the spring 40 on the release 16 forcing the front of the prong 42 toward and into the groove 32 of the tubular piston 14 and the coil expansion spring 34 forcing the second shoulder 30 on the tubular piston 14 against the prong 42 in a rearward direction.

Activating the release 16 by pressing on the rear portion of the release 16 removes the prong 42 from the groove 32 on the tubular piston 14 resulting in the tubular piston 14 rapidly and forcefully being longitudinally slid in a rearward direction of the longitudinal axis of the hollow, elongated body member 12 by the coil expansion spring 34 decompressing and forcing the first shoulder 28 on the tubular piston 14 in a rearward direction within the cylindrical, hollow bore 26, said longitudinal rearward sliding by the tubular piston 14 stopping when the first shoulder 28 on the tubular piston 14 strikes the circular, internally threaded collar 22.

Figure 3:
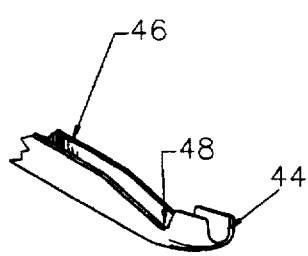
FIG. 3 shows the grooved and notched front end of the tubular piston of the knot tyer of the present invention.

As shown in FIG. 3, the tubular piston 14 has a grooved and notched front end 44. The front end 44 of the tubular piston 14 is grooved so as to be open on the top and hollow internally. The front end 44 of the tubular piston 14 has a diagonal notch 48 in the shape of a jaw cut therethrough. The groove 46 in the front end 44 of the tubular piston 14 accommodates leader or other line for knot tying purposes. The diagonal notch 48 in the shape of a jaw in the front end 44 of the tubular piston 14 may accommodate fish hooks for removal thereof.

To remove a fish hook embedded under the skin, first slide the tubular piston 14 in a forward direction within the hollow, elongated body member 12 until the prong 42 on the release 16 engages the second shoulder 30 within the groove 32 of the tubular piston 14. The knot tyer 10 is then cocked. Second, press the eye of the hook firmly against the skin and place the bend of the fish hook in the diagonal notch 48 in the shape of a jaw in the front end 44 of the tubular piston 14. Last, while pressing the eye of the hook firmly against the skin, activate the release 16 and the rapid, forceful rearward sliding of the tubular piston 14 will quickly remove the fishing hook from the skin.

To tie a knot attaching a leader or other fishing line, cock the knot tyer 10. Place the knot tyer 10 in the palm of either hand with the thumb lying on the release 16. Thread the free end of the larger diameter line longitudinally along the longitudinal length of the knot tyer, into the groove 46 in the front end 44 of the tubular piston 14 and approximately 4" to 6" beyond the notched front end 44 of the tubular piston 14. The short end of the line is then placed into the notch 48 at the front end 44 of the tubular piston 14 and wrapped into a tight coil using 4–7 wraps, starting at the notched end of the tubular piston 14 and wrapped back toward the hollow, elongated body member 12. From the hollow, elongated body member 12 side of the wraps of line, the tag end of the line is threaded through the groove 46 under all wraps, exiting at the notched tip. The wraps are then snugged or tightened gently. 1" to 2" of a second line is then placed through the groove 46 of the notched tip under the wraps back toward the hollow, elongated body member 12. Each end of the line is held snug and the release 16 activated, causing the withdrawal of the tubular piston 14 and leaving the first line wrapped loosely around the second line. Each end of the first line is then slowly snugged while the wraps are kept tightly bunched together. The first line is then securely tightened on the second line and the ends of the lines may be trimmed close to the knot. The know may then be covered with rubber based cement for added strength.

What is claimed is:

1. A knot tyer comprising:
    a hollow, elongated body member having a cylindrical, hollow bore therethrough on a longitudinal axis;
    a circular, externally threaded opening on a rear end of said hollow, elongated body member;
    a circular, internally threaded collar, said collar engaging in tightening manner said circular, externally threaded opening;
    a tapered opening on a front end of said hollow, elongated body member;
    a release mounted on said front end of said hollow, elongated body member;
    a tubular piston slidably mounted and constrained within said cylindrical, hollow bore of said hollow, elongated body member;
    said release being for said tubular piston;
    said tubular piston having a first shoulder, a second shoulder, and a groove extending around the diameter thereof;
    said cylindrical, hollow bore having a diameter in said front end of said hollow, elongated body member and a diameter in said rear end of said hollow, elongated body member, which diameter in said front end of said hollow, elongated body member is a smaller diameter than said diameter of said cylindrical, hollow bore in said rear end of said hollow, elongated body member;
    a coil expansion spring encircling said tubular piston within said hollow, elongated body member;
    said cylindrical, hollow bore in said rear end of said hollow, elongated body member accommodating in free longitudinally sliding manner said first shoulder on said tubular piston as well as said coil expansion spring encircling said tubular piston;
    a shoulder created internally of said hollow, elongated body member by a reduction in diameter of said cylindrical, hollow bore;
    said coil expansion spring being held in said encircling position by said first shoulder on said tubular piston and said shoulder created internally of said hollow, elongated body member by said reduction in said diameter of said cylindrical, hollow bore;
    said first shoulder on said tubular piston and said coil expansion spring encircling said tubular piston being constrained within said cylindrical, hollow bore by said circular, internally threaded collar;
    said cylindrical, hollow bore in said front end of said hollow, elongated body member accommodating in free longitudinally sliding manner a second shoulder and a groove on said tubular piston;
    said release being mounted externally on said front end of said hollow, elongated body member;
    said release being pivotally attached to said hollow, elongated body member by a pin, said pin allowing said release to pivot on said hollow, elongated body member;
    said release being held in a closed position by a spring, said spring being located on said rear portion of said release;
    said release having a prong, said prong seating in said groove on said tubular piston and being held in said groove on said tubular piston by said spring on said release;
    said tubular piston having a grooved and notched front end;
    said front end of said tubular piston being grooved so as to be open on the top and hollow internally; and,
    said front end of said tubular piston having a diagonal notch in the shape of a jaw cut therethrough.

* * * * *